S. G. JONES.
Hand Corn-Planter.

No. 133,709.  Patented Dec. 10, 1872.

Witnesses.
Edwin James
N. E. Gordon.

Inventor.
Samuel G. Jones,
per J. E. F. Holmead.
Attorney.

UNITED STATES PATENT OFFICE.

SAMUEL G. JONES, OF PHILADELPHIA, PENNSYLVANIA.

IMPROVEMENT IN HAND CORN-PLANTERS.

Specification forming part of Letters Patent No. 133,709, dated December 10, 1872.

*To all whom it may concern:*

Be it known that I, SAMUEL G. JONES, of the city and county of Philadelphia and State of Pennsylvania, have invented certain new and useful Improvements in Hand Corn-Planters, of which the following is a full, clear, and exact description, reference being had to the accompanying drawing, and the letters of reference marked thereon making part of this specification, in which—

Figure 1:
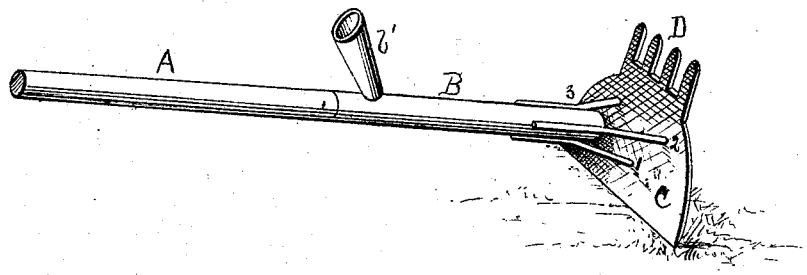
Figure 2:
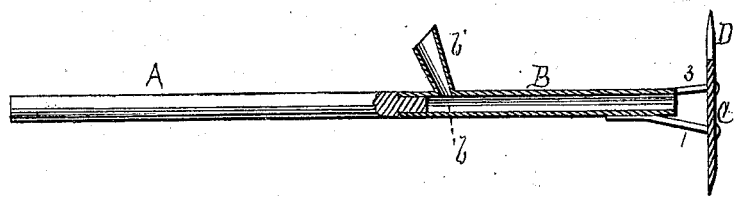

Figure 1 is a perspective view, and Fig. 2 is a longitudinal sectional view.

The object of my invention is to furnish an exceedingly cheap, durable, and accurate hand-planter for corn and other seeds, one that in its construction is as simple as the ordinary garden and field hoe, and in which the ordinary sack, spring, trigger-rod, valves, and all other like mechanism are entirely dispensed with. The nature of my invention consists in attaching to a short section of such a handle as is generally recognized as a hoe or rake handle a tube provided at its upper section with an orifice, through which the corn or other seed is fed. Said tube has projecting from its lower section or mouth three fingers or prongs, by means of which it is securely fastened to a hoe-blade of any desired form or contour. By these fingers or prongs the tube and blade are securely and firmly attached and held together.

When in use the blade is at the same angle to the tube as in the ordinary hoe. This causes the arrest of the seed by the blade, and in connection with the lower prong, which is attached at the direct center of the mouth of the tube, deflects and properly distributes in the hill the grains, so that the seeds shall not be left so closely huddled or crowded together as to interfere with their proper germinating or sprouting.

The upper section of the hoe-blade may be provided with rake-teeth if desired.

The construction and operation of my invention are as follows:

A is a short round section of an ordinary hoe or rake-handle, and is inserted into the upper section of a metallic tube, B. This tube may be of any desired dimensions, care being taken that its length is sufficent as to leave the orifice or opening $b$ at its upper section in a position to enable the operator to feed the desired charge without stooping, and which will also enable him to see that it is properly planted in rows most convenient for after cultivation. In this opening or orifice $b$ may be inserted a short bell-mouthed tube or funnel, $b'$, and which in many cases will aid in facilitating the feeding of the seed or grain to the tube B. The open or lower section or mouth of the tube B has secured on its outer surface three fingers or rods, 1, 2, and 3, arranged in a triangular form thereon and expanding outwardly as they project, care being taken that the finger or rod 1 is at the immediate center of the lower section of the mouth of the tube B. C is an ordinary hoe-blade of any desired form, and is permanently secured to the tube B by the fingers or rods 1, 2, and 3, they being respectively riveted or otherwise attached to said blade, as clearly shown in Fig. 1. The hoe-blade C may have attached rake-fingers D, as clearly illustrated in the accompanying drawing.

The great desideratum in planting corn and other like grains and seed is that they shall be properly deposited in straight rows for after weeding and cultivation, and not so crowded or huddled together as to interfere with their proper sprouting and growth. All this my improved planting-hoe most admirably accomplishes.

To illustrate the operation more fully—say, for instance, we desire to plant corn—the operator is provided with a sack containing the grain; with a few blows he loosens the ground so as as to open the hill; then he takes the three or four grains, as he may desire, and deposits them in the orifice $b$, whence they rapidly descend through the tube B, and, striking the blade C, are arrested and deflected toward the hill, the blade and rod 1 causing them to be distributed within the hill so that they shall not be too crowded, yet at the same time the tube and blade are so arranged that the winds, which always, more or less, prevail at this season, (the spring of the year,) have no effect in scattering the grains, the tube acting as a close conductor.

What I claim as new, and desire to secure by Letters Patent of the United States, is—

The tube B having orifice $b'$, and rods 1, 2, and 3 secured thereon, in combination with the hoe-blade C, the whole being arranged so as to operate substantially as described.

In testimony whereof I have signed my name to this specification in the presence of two subscribing witnesses.

SAMUEL G. JONES.

Witnesses:
 EDWIN JAMES,
 JOS. T. K. PLANT.